(12) United States Patent
Nagata et al.

(10) Patent No.: US 9,114,741 B2
(45) Date of Patent: Aug. 25, 2015

(54) SIDE SHIELD STRUCTURE FOR VEHICLE SEAT

(75) Inventors: Tomoaki Nagata, Nagoya (JP); Koichiro Kondo, Toyoake (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 501 days.

(21) Appl. No.: 13/483,525

(22) Filed: May 30, 2012

(65) Prior Publication Data
US 2012/0313408 A1    Dec. 13, 2012

(30) Foreign Application Priority Data

Jun. 13, 2011   (JP) ................. 2011-131274

(51) Int. Cl.
| | |
|---|---|
| A47C 7/02 | (2006.01) |
| B60N 2/42 | (2006.01) |
| B60N 2/427 | (2006.01) |
| B60N 2/58 | (2006.01) |
| B60N 2/60 | (2006.01) |
| B60N 2/68 | (2006.01) |
| B60R 22/26 | (2006.01) |
| B60R 22/18 | (2006.01) |

(52) U.S. Cl.
CPC .......... *B60N 2/4235* (2013.01); *B60N 2/42709* (2013.01); *B60N 2/58* (2013.01); *B60N 2/6009* (2013.01); *B60N 2/682* (2013.01); *B60R 22/26* (2013.01); *B60R 2022/1818* (2013.01); *B60R 2022/263* (2013.01)

(58) Field of Classification Search
CPC ...... B60N 2/58; B60N 2/6009; B60N 2/0732; B60N 2/0725; B60N 2/441; B60R 22/26; B60R 13/02
USPC ............ 297/452.38, 482, 463.1, 463.2, 216.1
See application file for complete search history.

(56) References Cited

U.S. PATENT DOCUMENTS

| | | | | | |
|---|---|---|---|---|---|
| 5,007,682 | A | * | 4/1991 | Kuwabara et al. ........ | 297/452.38 |
| 5,288,133 | A | * | 2/1994 | Mizushima et al. ..... | 297/452.38 |
| 5,318,350 | A | * | 6/1994 | Okamoto ...................... | 297/468 |
| 6,149,241 | A | * | 11/2000 | Waku et al. ................ | 297/463.2 |
| 7,905,462 | B2 | * | 3/2011 | Toma et al. ................... | 248/429 |
| 7,997,656 | B2 | * | 8/2011 | Inagaki et al. ............ | 297/452.38 |
| 8,302,994 | B2 | * | 11/2012 | Ko ............................. | 280/801.1 |

(Continued)

FOREIGN PATENT DOCUMENTS

| | | |
|---|---|---|
| JP | 4-353055 | 12/1992 |
| JP | 6-135298 | 5/1994 |

(Continued)

OTHER PUBLICATIONS

Chinese Office action, dated May 6, 2014 along with an English-language translation thereof.
Japanese Office action dated Aug. 5, 2014, along with an English-language translation thereof.

*Primary Examiner* — Laurie Cranmer
(74) *Attorney, Agent, or Firm* — Greenblum & Bernstein, P.L.C.

(57) ABSTRACT

A first opening through which an end anchor of a seat belt is inserted from above is formed in a side shield member that covers a side portion of a seat cushion. A plug member that plugs up the first opening and has a belt guide hole through which a belt portion of the seat belt is inserted is fit into the first opening. A reinforcing member having a second opening in a portion corresponding to the first opening is arranged on an inside surface of the side shield member.

9 Claims, 8 Drawing Sheets

(56) References Cited

U.S. PATENT DOCUMENTS 8,353,561 B2 * 1/2013 Yamazaki et al. ....... 297/452.38
8,678,506 B2 * 3/2014 Beneker et al. .......... 297/452.18
8,757,702 B2 * 6/2014 Biebel et al. ............. 296/187.05

2011/0057498 A1 3/2011 Fujita et al.

FOREIGN PATENT DOCUMENTS

| JP | 2000-344036 | 12/2000 |
| JP | 2004-142580 | 5/2004 |

* cited by examiner ic significance of exemplary embodiments of the invention will be described below with reference to the accompanying drawings...

SIDE SHIELD STRUCTURE FOR VEHICLE SEAT

INCORPORATION BY REFERENCE

The disclosure of Japanese Patent Application No. 2011-131274 filed on Jun. 13, 2011 including the specification, drawings and abstract is incorporated herein by reference in its entirety.

BACKGROUND OF THE INVENTION

1. Field of the Invention

The invention relates to a side shield structure for a vehicle seat.

2. Description of Related Art

One known side shield structure for a vehicle seat has an opening through which an end anchor (that functions as a mounting bracket) of a seat belt can be inserted from above formed in a side shield member (that functions as a cushion finisher) that covers a side portion of a seat cushion (see Japanese Patent Application Publication No. 6-135298 (JP 6-135298 A), for example). A plug member (that functions as a cover body) that plugs up the opening and has a belt guide hole through which a belt portion of the seat belt can be inserted is fit into this opening.

In a side shield structure of a vehicle seat having this kind of structure, even if the opening of the side shield member is made large in order to facilitate the operation of inserting the end anchor of the seat belt, it is possible to prevent the appearance from deteriorating due to the opening of the side shield member by plugging up the opening by fitting the plug member into it. However, while making the opening of the side shield member larger does make it easier to insert the end anchor of the seat belt, it may also lead to a reduction in strength of the side shield member.

SUMMARY OF THE INVENTION

The invention relates to a side shield structure for a vehicle seat, that is capable of inhibiting a reduction in strength due to an opening of a side shield member.

One aspect of the invention relates to a side shield structure for a vehicle seat, that includes a side shield member that covers a side portion of a seat cushion, an opening that is formed in the side shield member and through which an end anchor of a seat belt is inserted from above, and a plug member that plugs up the opening. The plug member has a belt guide hole through which a belt portion of the seat belt is inserted, and a reinforcing member having an opening in a portion corresponding to the opening is arranged on an inside surface of the side shield member.

According to this structure, arranging the reinforcing member that has an opening in a portion corresponding to the opening in the side shield member on the inside surface of the side shield member makes it possible to inhibit a reduction in strength of the side shield member while maintaining the ability to insert the end anchor of the seat belt. In other words, even if the opening in the side shield member is made large in order to make it easier to insert the end anchor of the seat belt, a reduction in strength of the side shield member can be inhibited by the reinforcing member while the appearance is prevented from deteriorating by plugging up the opening with the plug member.

The reinforcing member may have a joining portion that abuts against and is joined to the inside surface of the side shield member, and a box-shaped sectional component that, together with the side shield member, forms a portion with a box-shaped cross section.

According to this structure, the reinforcing member is able to be integrally arranged on the inside surface of the side shield member by abutting the joining portion of the reinforcing member against the inside surface of the side shield member and joining them together. Also, the side shield member is able to be efficiently reinforced by forming the box-shaped sectional portion by the side shield member, together with the box-shaped sectional component of the reinforcing member.

With the side shield structure for a vehicle seat described above, the reinforcing member may be formed by molding synthetic resin material, and an impact absorbing structure capable of absorbing impact force in a lateral direction may be integrally formed with the reinforcing member simultaneously with the molding.

According to this structure, impact force in the lateral direction acting on the side shield member is able to be absorbed by the impact absorbing structure of the reinforcing member. Also, the impact absorbing structure is able to be integrally formed at the same time the reinforcing member is formed by molding synthetic resin, which makes it possible to avoid the trouble of manufacturing the impact absorbing structure separately from the reinforcing member and then assembling the two together, and is thus very effective for reducing costs.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Modes for carrying out the invention will now be described according to example embodiments.

Figure 1:
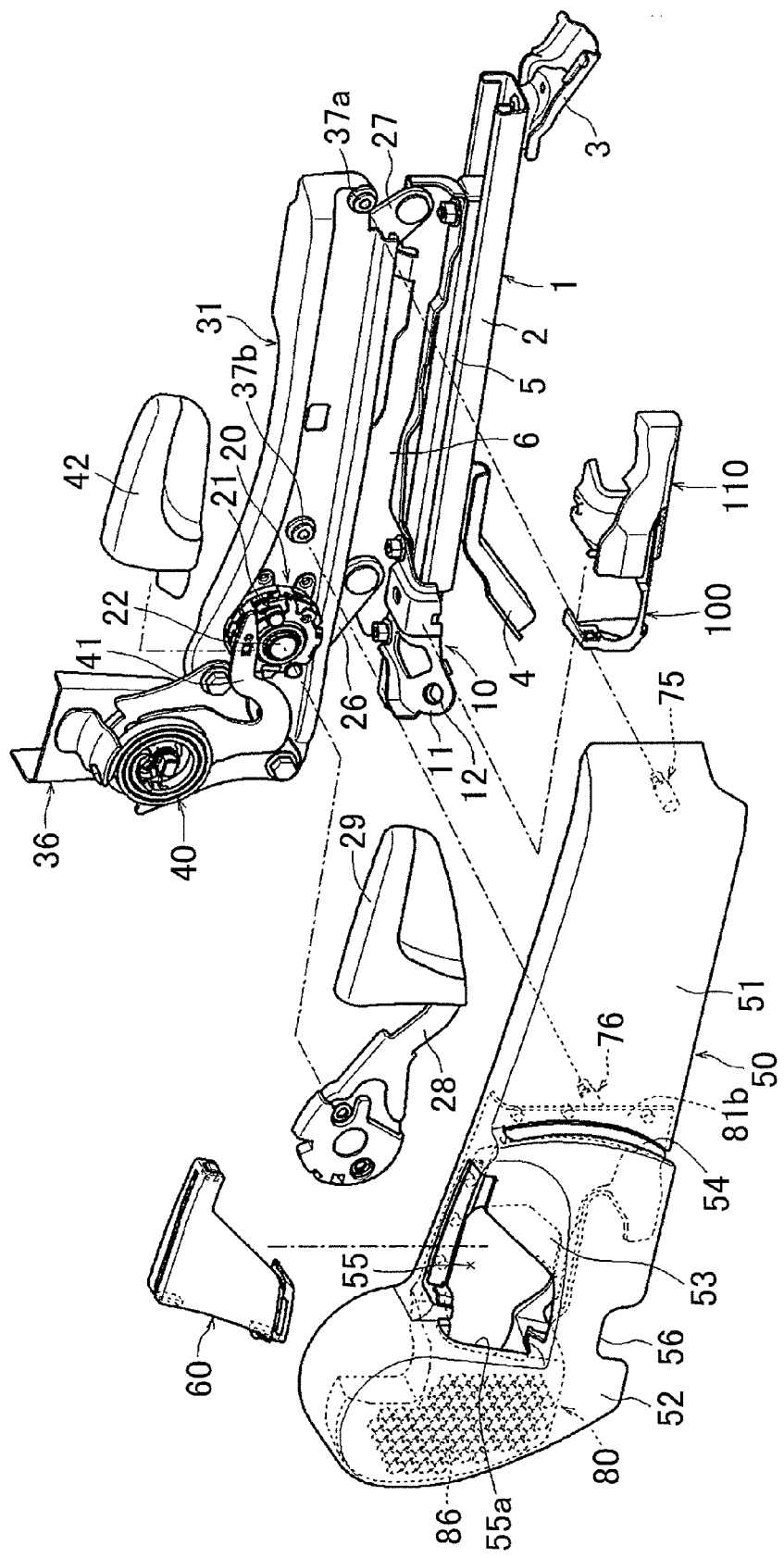
FIG. 1 is an exploded perspective view showing the relationship between a side frame of a seat cushion, a side shield member, and a reinforcing member used in a side shield structure for a vehicle seat according to an example embodiment of the invention.

The side shield structure for a vehicle seat according to an example embodiment of the invention will now be described with reference to the drawings. As shown in FIG. 1, a side frame 31 of a cushion frame that forms a frame portion of a seat cushion of a vehicle seat is attached so as to be able to slide by a slide rail mechanism 1 and raised and lowered by a raising/lowering mechanism 20. The slide rail mechanism 1 includes a lower rail 2 that extends in a longitudinal direction, and an upper rail 5 that is fitted so as to be able to slide along this lower rail 2. The lower rail 2 is fixed to a vehicle cabin floor by a front rail bracket 3 and a rear rail bracket 4. The front rail bracket 3 is fixed to a front portion of the lower surface of the lower rail 2 and the rear rail bracket 4 is fixed to a rear portion of the lower surface of the lower rail 2.

A bracket 6 is fixed to an upper surface of the upper rail 5, and the side frame 31 of the seat cushion is mounted to this bracket 6 by a driving link 26 and a driven link 27 that form the raising/lowering mechanism 20. Also, a raising/lowering lever 28 is fitted around a shaft end portion of a center shaft 22 of a raising/lowering driving portion 21 of the raising/lowering mechanism 20, and an operating knob 29 is fitted onto a tip end portion of this raising/lowering lever 28. The raising/lowering mechanism 20 may employ a well-known structure such as that described in Japanese Patent Application Publication No. 2009-227011 (JP 2009-227011 A), for example.

Figure 2:
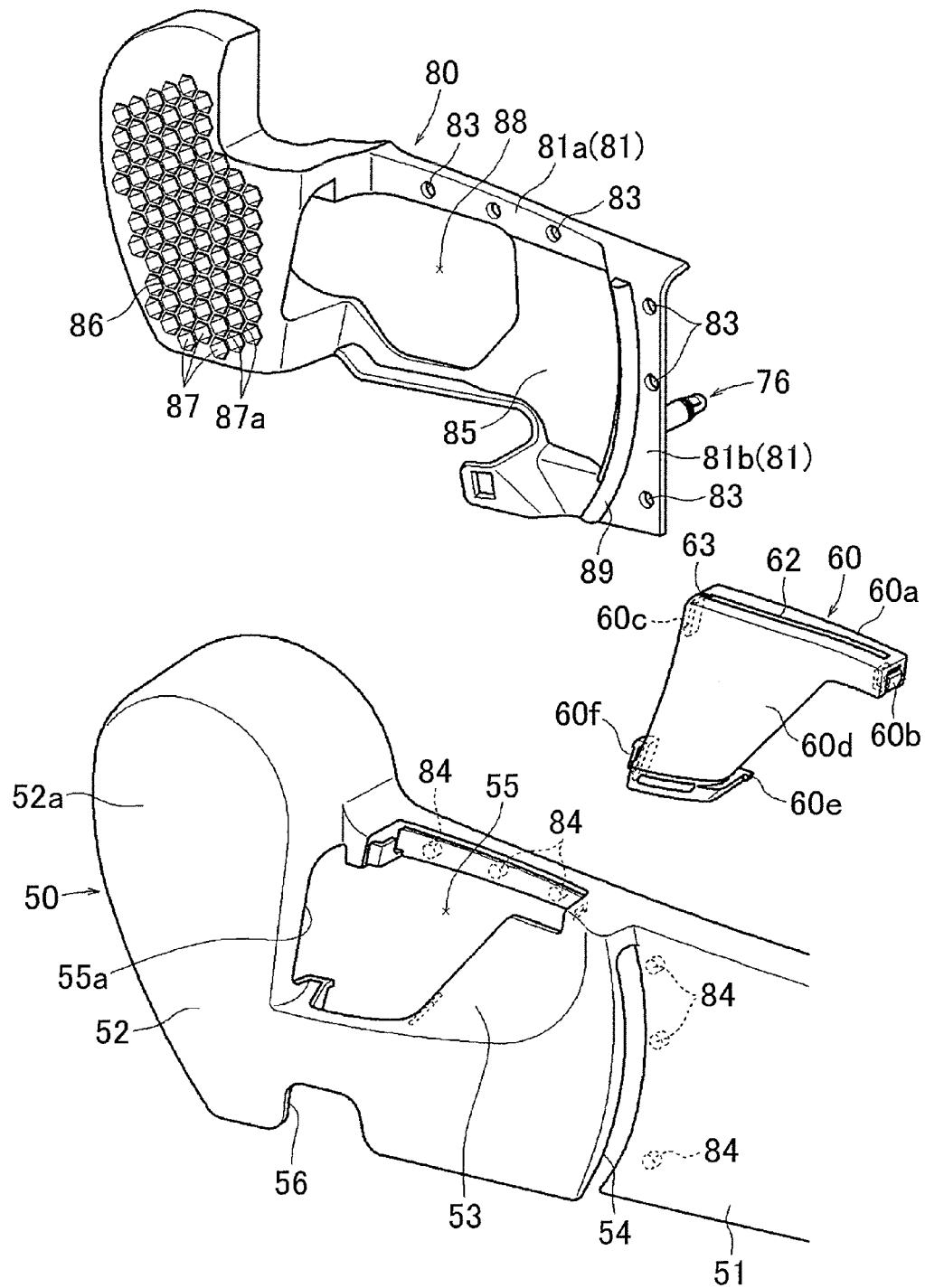
FIG. 2 is an exploded perspective view of the side shield member, the reinforcing member, and a plug member separated from each other.

As shown in FIGS. 1 and 2, a lower portion of a side frame 36 of a seat back is connected by a reclining mechanism 40 to a rear portion of the side frame 31 of the seat cushion. Also, an operating knob 42 is attached to a tip end portion of a reclining lever 41 that extends from the reclining mechanism 40.

As shown in FIGS. 1 and 2, a fixing member 10 is fixed to a rear end portion of the upper rail 5 that is positioned underneath a seat cushion side portion, and a belt fastening portion 11 extends out on an outside portion of this fixing member 10. A through-hole 12 corresponding to a fastening bolt 15 (FIG. 7) is formed in the belt fastening portion 11. In other words, the through-hole 12 is formed in the belt fastening portion 11, in a position fixed by the fastening bolt 15. The fastening bolt 15 is a fastening member that fastens an end anchor 72 of a seat belt 70. A nut (i.e., a weld nut), not shown, is fixed around the periphery the through-hole 12 on the back side of the belt fastening portion 11.

As shown in FIG. 1, a side shield member 50 that is made of synthetic resin and covers the side portion of the slide rail mechanism 1 and the side frame 31 is arranged on a side portion of the side frame 31 of the seat cushion. This side shield member 50 includes a front side portion 51 that covers the front half of the side portion of the slide rail mechanism 1 and the side frame 31, and a rear side portion 52 that is integrally provided with the front side portion 51 and covers the rear half of the side portion of the slide rail mechanism 1 and the side frame 31. The rear side portion 52 is formed protruding out farther to the side than the front side portion 51 in order to cover the reclining mechanism 40 and the raising/lowering driving portion 21 of the raising/lowering mechanism 20.

A slit portion 54 through which the raising/lowering lever 28 is inserted so that it can be operated vertically is formed in a step portion between the front side portion 51 and the rear side portion 52 of the side shield member 50. Also, clips 75 and 76 are arranged in a plurality of locations in the front and rear on the inside wall side of the front side portion 51 of the side shield member 50. Each of these clips 75 and 76 is provided in a position corresponding to a boss portion 37a and 37b that protrudes on an outside wall of the side frame 36 of the seat cushion. The side shield member 50 is then fitted to the side of the side frame 36 by pushing the clips 75 and 76 of the side shield member 50 into the boss portions 37a and 37b from the side of the side frame 36 so that they elastically engage. In this example embodiment, the clip 76 on the rear side of the front side portion 51 of the side shield member 50 is arranged on a tip end of a protruding portion that protrudes out from an inside surface of a front edge joining portion 81b of a reinforcing member 80 that will be described later.

Figure 6:
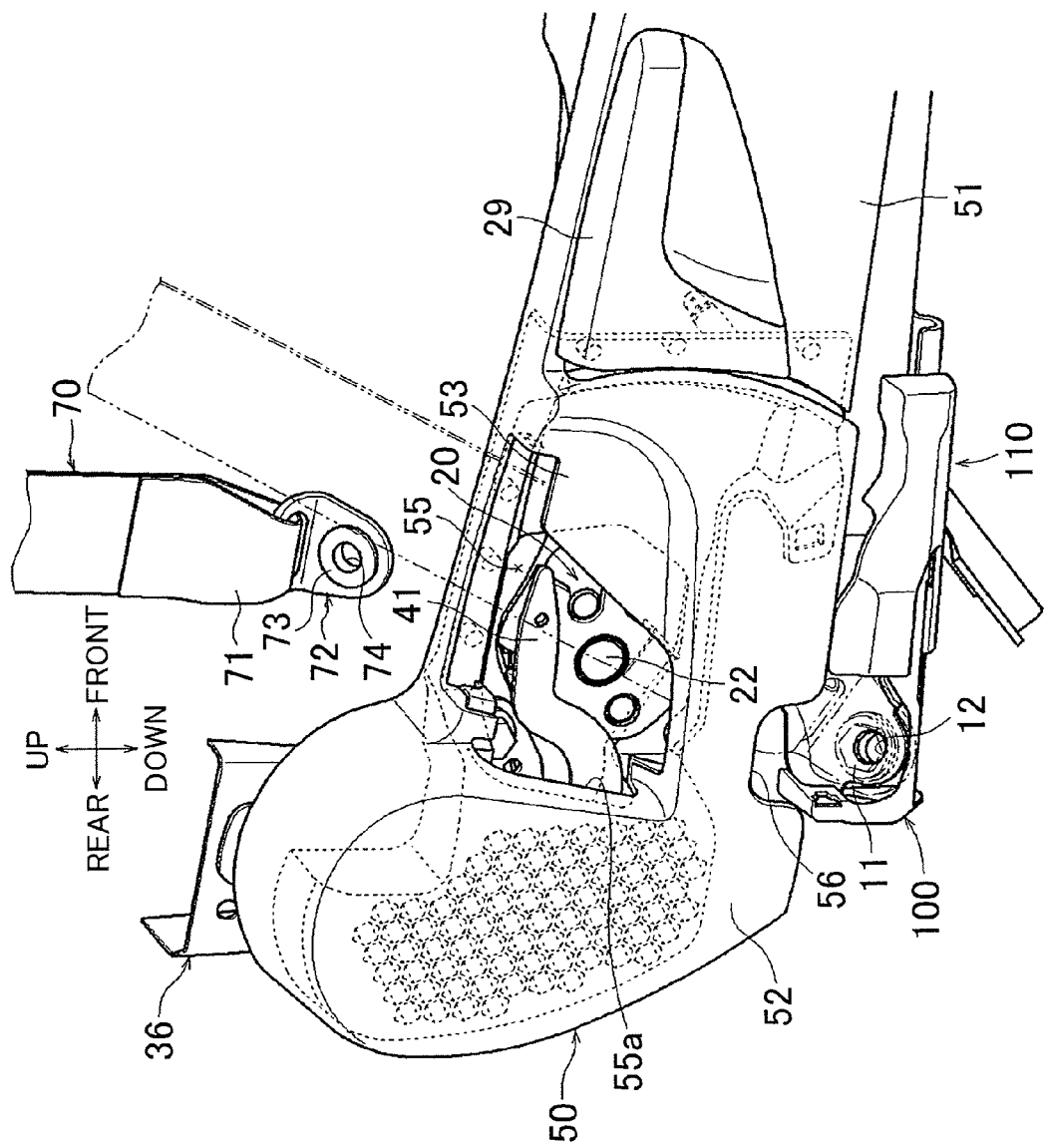
FIG. 6 is a perspective view showing a state before an end anchor of a seat belt is inserted into an opening in the side shield member from above when the side shield member is assembled to the side frame of the seat cushion.

As shown in FIGS. 1, 2, and 6, a recessed portion 53 is formed on a side center upper portion of the rear side portion 52 of the side shield member 50, and an opening 55 through which the end anchor 72 that is attached to an end portion 71 of the seat belt 70 can be inserted from above is formed in a bottom surface of this recessed portion 53. The opening 55 is shaped, when viewed from the side, in a trapezoidal shape with a wide upper portion and a narrow lower portion. The front edge of the opening 55 is shaped slanting downwards from the upper end. Also, a lever inserting portion 55a that is continuous with the rear edge of the opening 55 and through which a tip end portion of the reclining lever 41 is inserted is formed in a rear side portion of the recessed portion 53. Also, a cutout portion 56 that exposes the belt fastening portion 11 of the fixing member 10 is formed below the recessed portion 53 of the side shield member 50.

Figure 3:
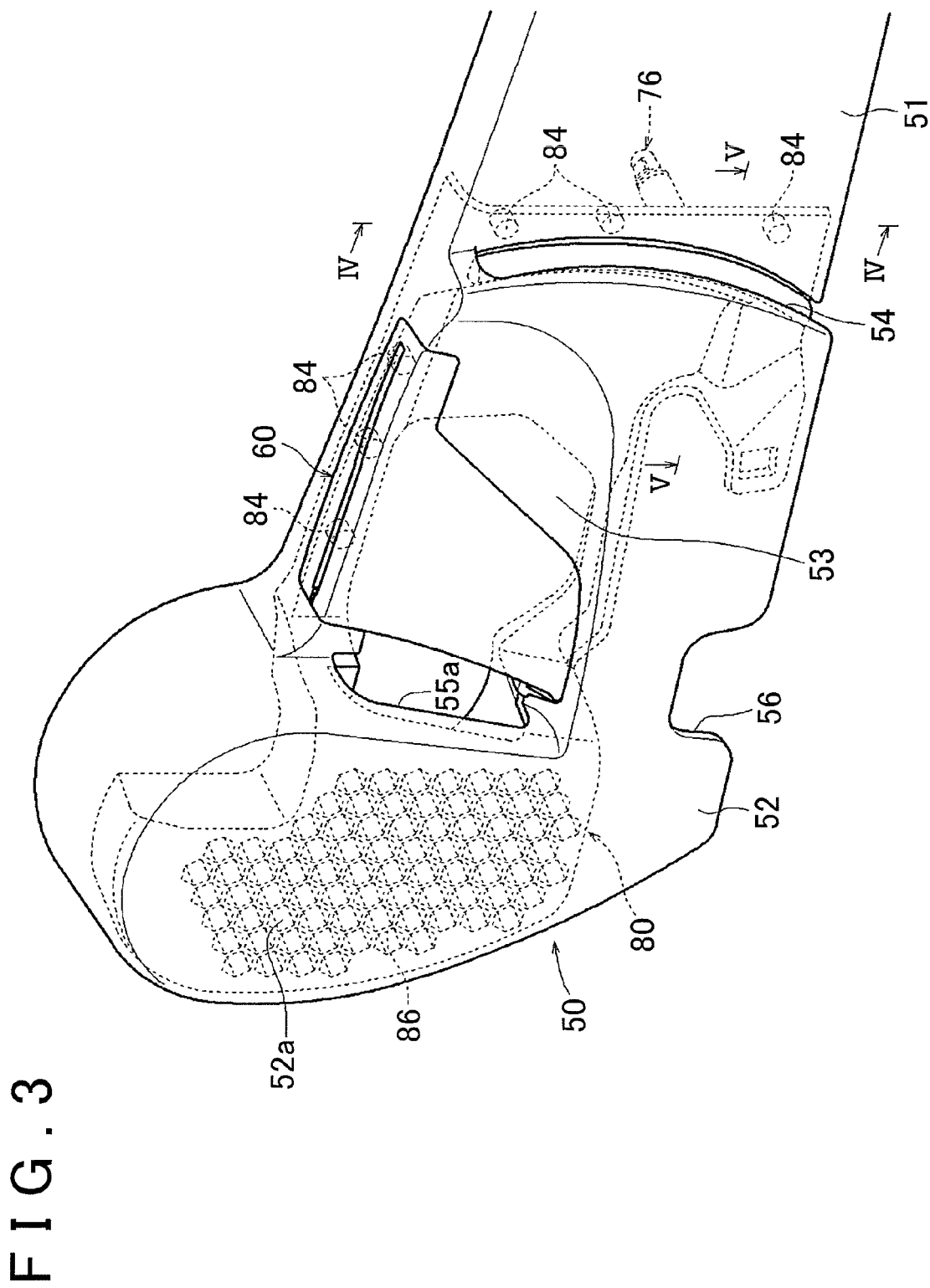
FIG. 3 is a perspective view of the reinforcing member assembled to the inside of the side shield member.

As shown in FIGS. 2 and 3, a plug member 60 that plugs up the opening 55 of the side shield member 50 is fit into the opening 55. After the seat belt 70 is fixed, the plug member 60 is later attached by being inserted into the opening 55 of the side shield member 50 from above. That is, an opening frame portion 60a that has a belt guide hole 62 that guides a belt portion of the seat belt 70 in and out is formed on an upper portion of the plug member 60, and a belt inserting slit 63 through which the belt portion of the seat belt 70 is able to be inserted into the belt guide hole 62 is formed in one end portion of this opening frame portion 60a. Also, elastic retaining pawls 60b and 60c are formed, one at each end of the opening frame portion 60a. These elastic retaining pawls 60b and 60c elastically engage with engaging portions formed on the front and rear portions of the upper portion of the opening 55 of the side shield member 50. Furthermore, elastic retaining pawls 60e and 60f are formed, on one each of the front and rear portions of the lower portion of a covering portion 60d that extends downward from the opening frame portion 60a. These elastic retaining pawls 60e and 60f elastically engage with engaging portions formed on the front and rear portions of the lower portion of the opening 55 of the side shield member 50.

As shown in FIGS. 2 and 3, the reinforcing member 80 is arranged on the inside surface of the side shield member 50. This reinforcing member 80 is formed of a size and shape that extends from the rear end portion of the front side portion 51 of the side shield member 50 to the rear side portion 52. Also, an opening 88 that opens without reducing the opening area of the opening 55 of the side shield member 50 is formed at a portion that corresponds to the opening 55 of the side shield member 50, in a center portion of the reinforcing member 80.

As shown in FIGS. 2 and 3, the reinforcing member 80 is provided with a joining portion 81 that abuts against and is joined to an inside surface of the side shield member 50, and a box-shaped sectional component 85 that, together with the side shield member 50, forms a portion with a box-shaped cross section. The box-shaped sectional component 85 has a side wall that faces the inside surface of the side shield member. The shape of the exterior when the side shield member 50 and the box-shaped sectional component 85 are put together is generally box-shaped. In this example embodiment, the joining portion 81 has an upper edge joining portion 81a provided on a portion that follows the upper edge of the reinforcing member 80, and a front edge joining portion 81b provided on a portion that follows the front edge. Also, the box-shaped sectional component 85 is part of the reinforcing member 80 and is formed in a position opposing a portion between the slit portion 54 and the opening 55 of the side shield member 50.

Figure 4:
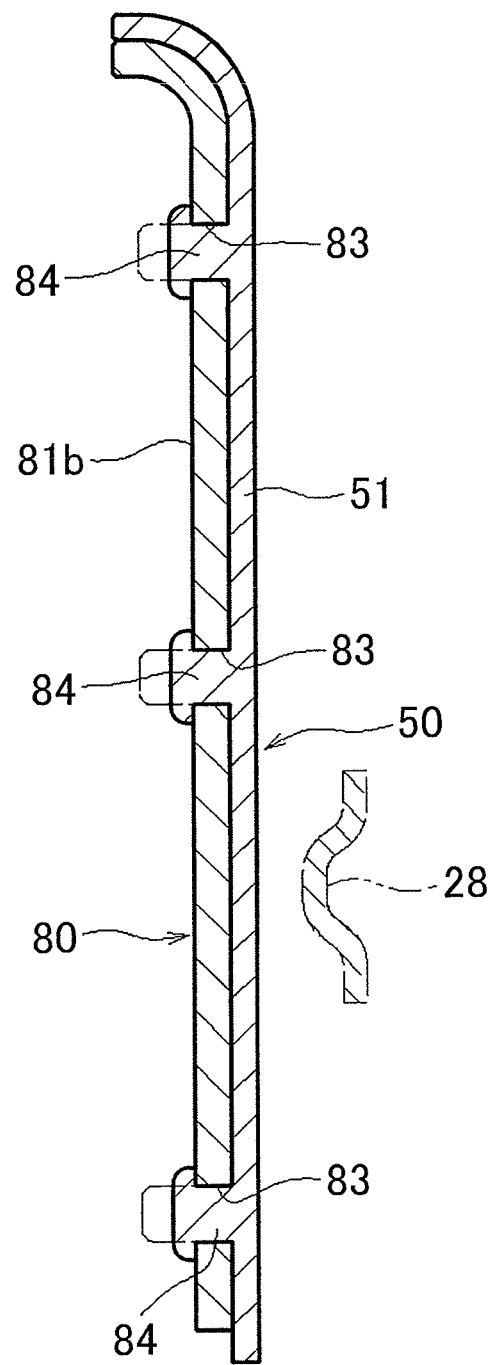
FIG. 4 is a sectional view taken along line IV-IV in FIG. 3.

Also, a plurality of through-holes 83 are formed in the joining portions 81a and 81b. A plurality of crimping pins 84 are integrally formed on and protrude out from the inside surface of the side shield member 50. The each crimping pins 84 is inserted into the each through-holes 83. After the plurality of crimping pins 84 are inserted into the through-holes, the tip ends of the crimping pins 84 are crimped such that the reinforcing member 80 is integrally attached to the inside surface of the side shield member 50 (see FIG. 4). With the reinforcing member 80 attached, a hollow box-shaped sectional portion is formed by the portion between the slit portion 54 and the opening 55 of the side shield member 50, together with the box-shaped sectional component 85 of the reinforcing member 80 (see FIG. 5).

Figure 5:
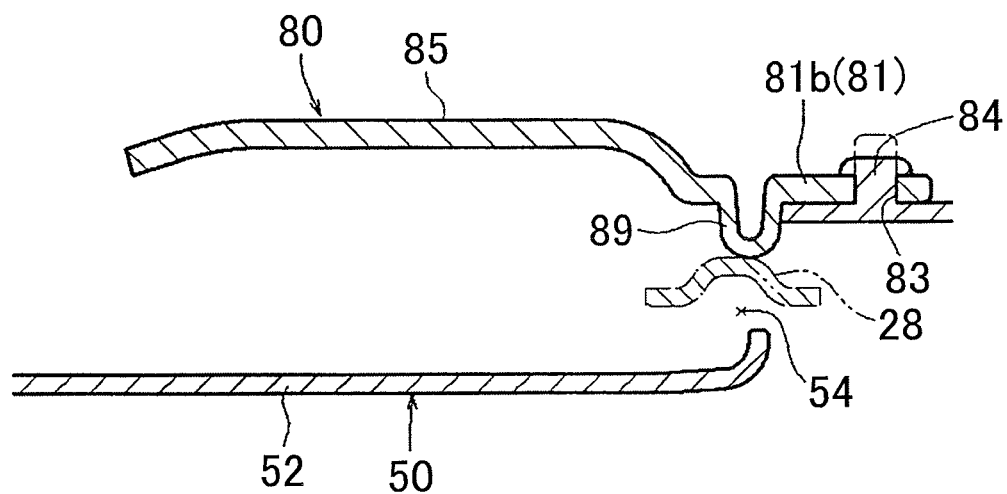
FIG. 5 is a sectional view taken along line V-V in FIG. 3.

Also in this example embodiment, a protruding portion in which the clip 76 is arranged on the tip end is formed protruding on the inside surface of the front edge joining portion 81b of the reinforcing member 80. Also, in this example embodiment, a protruding portion 89 that protrudes to form a curved shape along the inside edge of the slit portion 54 of the side shield member 50 and guides the raising/lowering lever 28 of the raising/lowering mechanism 20 is formed on the front edge joining portion 81b of the reinforcing member 80, as shown in FIGS. 2 and 5.

Also, in this example embodiment, the reinforcing member 80 is formed by molding synthetic resin material. For example, the reinforcing member 80 is formed by injecting molten synthetic resin material into a foaming die for injection molding. Also, an impact absorbing structure 86 capable of absorbing impact force in the lateral direction is integrally formed with the reinforcing member 80 at the same time that the reinforcing member 80 is molded. This impact absorbing structure 86 is formed by a honeycomb structure in which multiple hollow portions 87 that are open in the lateral direction are divided by ribs 87a. Also in this example embodiment, the impact absorbing structure 86 is formed corresponding to a portion 52a that is positioned on the rear side portion 52 of the side shield member 50 and covers the reclining mechanism 40. The lateral direction in which the reinforcing member 80 absorbs impact force is the lateral direction of the side shield member 50 and is also the lateral direction of the vehicle.

Also, in this example embodiment, a cover attaching member 100 is attached to the front upper surface of the fixing member 10 that is arranged on a rear end portion of the upper rail 5. Also, a cover member 110 that covers the belt fastening portion 11, the end anchor 72 of the seat belt 70, and the head of the fastening bolt 15 is attached, in a manner that enables it to be opened and closed, to the cover attaching member 100, in a position corresponding to the cutout portion 56 of the side shield member 50. For example, the cover member 110 is able to slide open and closed in the longitudinal direction.

Figure 7:
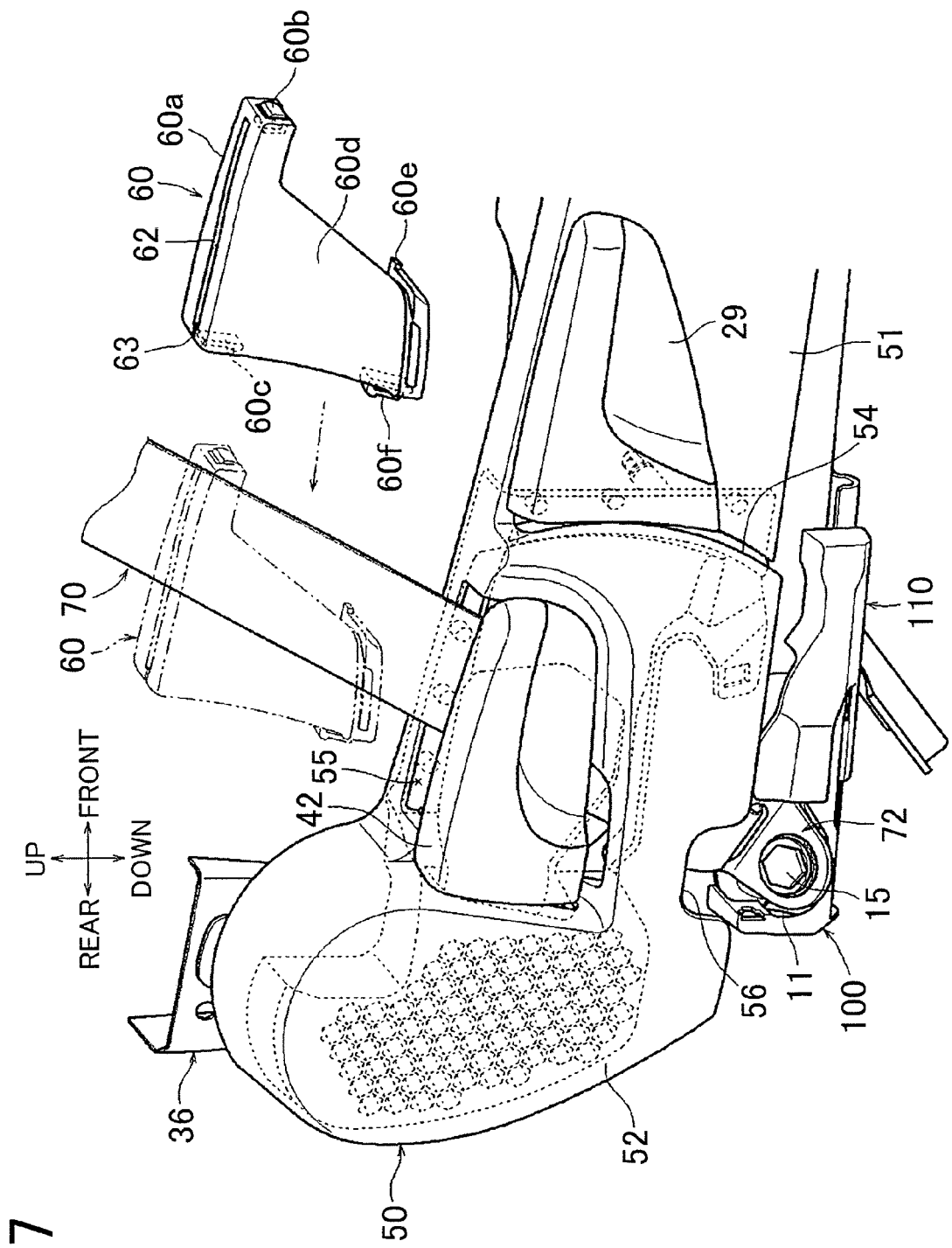
FIG. 7 is a perspective view of the end anchor of the seat belt fastened to the belt fastening portion.

The side shield structure for a vehicle seat according to this example embodiment is structured as described above. Therefore, when the end anchor 72 of the seat belt 70 is fastened to the belt fastening portion 11 by the fastening bolt 15 or the like, first, the end anchor 72 is inserted into the opening 55 of the side shield member 50 from above, as shown in FIG. 6. Then, the seat belt 70 is fastened to the belt fastening portion 11 by inserting the fastening bolt 15 through a mounting hole 74 in a mounting portion 73 of the end anchor 72 and screwing it into the nut of the belt fastening portion 11, as shown in FIG. 7.

Also in this example embodiment, after the seat belt 70 is fixed, the belt portion of the seat belt 70 is passed through the belt inserting slit 63 of the opening frame portion 60a of the plug member 60, and inserted through the belt guide hole 62.

Figure 8:
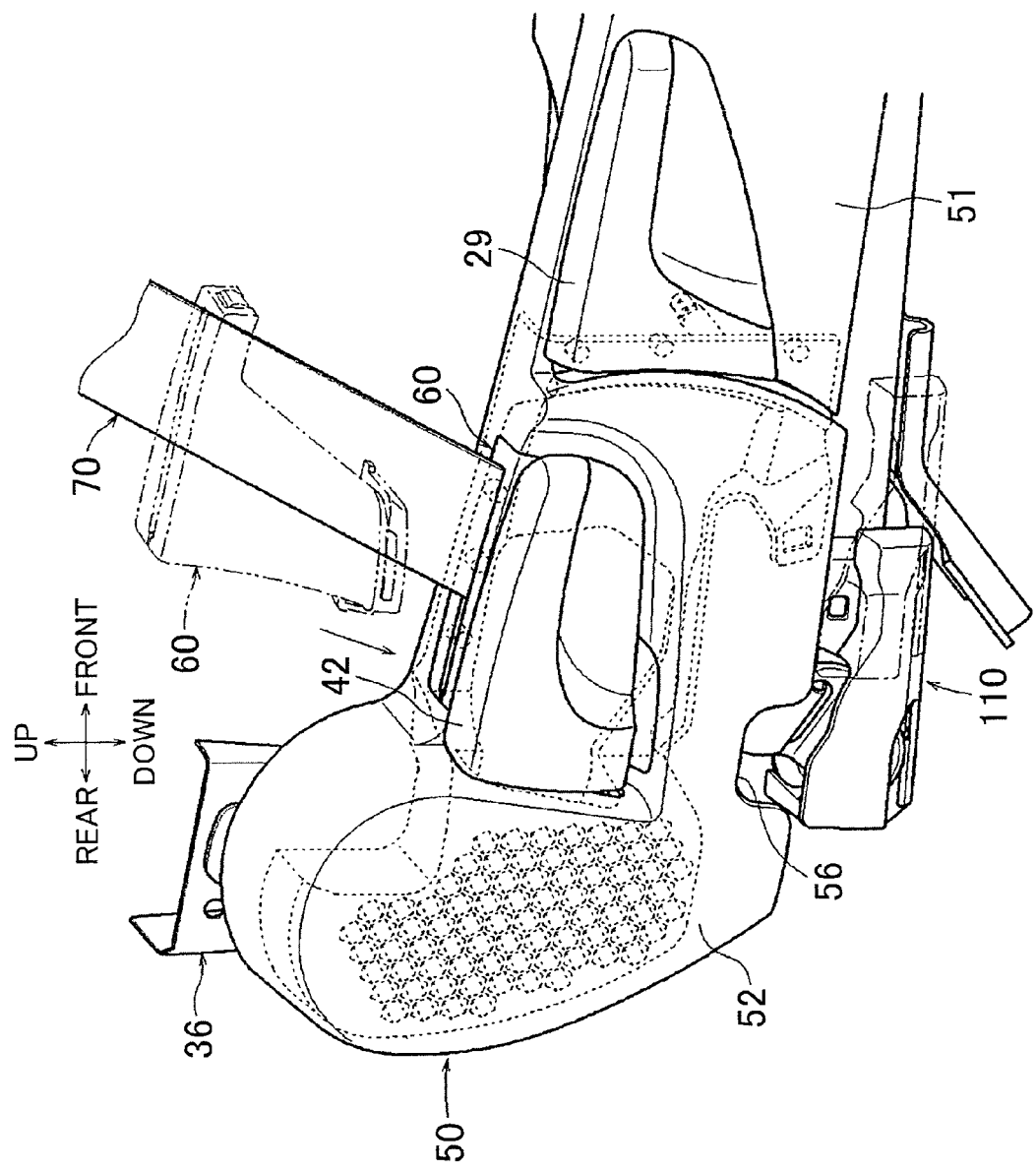
FIG. 8 is a perspective view of the belt fastening portion covered by a cover member.

In this state, the plug member 60 is inserted into the opening 55 of the side shield member 50 from above, and the elastic retaining pawls 60b, 60c, 60e, and 60f of the plug member 60 are made to engage with the engaging portions of the side shield member 50, such that the plug member 60 is mounted in the opening 55 of the side shield member 50, as shown in FIG. 8. Accordingly, the opening 55 of the side shield member 50 is able to be formed large enough so that the end anchor 72 of the seat belt 70 can be easily inserted, thereby enabling workability with respect to inserting this end anchor 72 to be increased. Furthermore, plugging up the opening 55 with the plug member 60 makes it possible to prevent foreign objects from getting into the opening 55, as well as prevents the appearance from deteriorating due to the opening 55.

As shown in FIGS. 2 and 3, the reinforcing member 80 having the opening 88 that corresponds to the opening 55 is arranged on the inside surface of the side shield member 50. Therefore, even if the opening 55 of the side shield member 50 is made large, the end anchor 72 of the seat belt 70 is able to be inserted easily and a reduction in strength due to the opening 55 of the side shield member 50 is able to be well prevented by the reinforcing member 80, while preventing the appearance from deteriorating due to the opening 55 by plugging up the opening 55 of the side shield member 50 with the plug member 60.

Also in this example embodiment, after the plurality of crimping pins 84 that are integrally formed on and protrude out from the inside surface of the side shield member 50 are inserted into the plurality of through-holes 83 in the upper edge and front edge joining portions 81a and 81b that form the joining portion 81 of the reinforcing member 80, the tip ends of the crimping pins 84 are crimped, thus enabling the reinforcing member 80 to be integrally joined to the inside surface of the side shield member 50. Also, the side shield member 50 is able to be efficiently reinforced by the reinforcing member 80, by forming the hollow box-shaped sectional portion by the portion between the slit portion 54 and the opening 55 of the side shield member 50, together with the box-shaped sectional component 85 of the reinforcing member 80.

Also, in this example embodiment, the impact absorbing structure 86 is able to well absorb impact force in the lateral direction acting on the portion 52a that is positioned on the rear side portion 52 of the side shield member 50 and covers the reclining mechanism 40, and thus provides excellent safety. Also, the impact absorbing structure 86 is integrally formed at the same time that the reinforcing member 80 is molded by molding synthetic resin. Therefore, it is possible to avoid the trouble of manufacturing the impact absorbing structure 86 separately from the reinforcing member 80 and then assembling the two together, which is very effective for reducing costs.

The invention is not limited to the example embodiment, but may be carried out in any of a variety of modes without departing from the scope thereof. For example, the joining portion 81 of the reinforcing member 80 may be integrally joined by a screw or the like to the inside surface of the side shield member 50, or may be integrally joined by adhesive to the inside surface of the side shield member 50. Also, the impact absorbing structure 86 may be manufactured separately from the reinforcing member 80 and then assembled to it. Moreover, the invention may also be carried out even if the impact absorbing structure 86 is not necessarily provided. Also, the opening area of the opening 55 formed in the side shield member 50 may be substantially equivalent to the opening area of the opening 88 formed in the reinforcing member 80.

What is claimed is:

1. A side shield structure for a vehicle seat, comprising:

a side shield member that covers a side portion of a seat cushion and has a first opening through which an end anchor of a seat belt is inserted from above, the side shield member having an interior recess provided at a rear end of the side shield member and adjacent the first opening;

a plug member that plugs up the first opening and has a belt guide hole through which a belt portion of the seat belt is inserted; and a reinforcing member that is arranged on an inside surface of the side shield member and has a second opening in a portion corresponding to the first opening, the reinforcing member having a bulbous portion provided at a rear end of the reinforcing member and adjacent the second opening, wherein the inside surface of the side shield member is a vertically extending surface that extends in a direction in which the seat belt is inserted, wherein the interior recess has a shape corresponding to a shape of the bulbous portion, and wherein the bulbous portion is nested within the interior recess.

2. The side shield structure for a vehicle seat according to claim 1, wherein the reinforcing member includes a joining portion that abuts against and is joined to the inside surface of the side shield member.

3. The side shield structure for a vehicle seat according to claim 2, wherein the reinforcing member includes a box-shaped sectional component of which, together with the side shield member, an external shape is generally box-shaped, and the box-shaped sectional component has a side wall that faces the inside surface of the side shield member.

4. The side shield structure for a vehicle seat according to claim 3, wherein the second opening, the bulbous portion, the joining portion, and the box-shaped sectional component are unitarily formed to provide the reinforcing member.

5. The side shield structure for a vehicle seat according to claim 1, wherein the reinforcing member is formed by molding synthetic resin material, and wherein the bulbous portion defines an impact absorbing structure capable of absorbing impact force in a lateral direction, the impact absorbing structure being integrally formed as part of the reinforcing member simultaneously with the molding.

6. The side shield structure for a vehicle seat according to claim 5, wherein the impact absorbing structure is a honeycomb structure that opens in a lateral direction of the side shield member.

7. The side shield structure for a vehicle seat according to claim 6, wherein the impact absorbing structure is provided in a position on a rear side portion of the side shield member and covering a reclining mechanism.

8. The side shield structure for a vehicle seat according to claim 1, wherein an opening area of the first opening formed in the side shield member is substantially equal to an opening area of the second opening formed in the reinforcing member.

9. The side shield structure for a vehicle seat according to claim 1, wherein the first opening of the side shield member penetrates the inside surface of the side shield member, and wherein the second opening of the reinforcing member penetrates a vertically extending surface of the reinforcing member such that the first opening and the second opening are aligned.

* * * * *